United States Patent [19]

Gavrilovic

[11] 4,013,582
[45] Mar. 22, 1977

[54] LIQUID CRYSTAL COMPOUNDS AND ELECTRO-OPTIC DEVICES INCORPORATING THEM

[75] Inventor: Dragan Milan Gavrilovic, Cranbury, N.J.

[73] Assignee: RCA Corporation, New York, N.Y.

[22] Filed: June 17, 1976

[21] Appl. No.: 696,904

[52] U.S. Cl. .............................. 252/299; 260/463; 260/465 D; 350/160 LC
[51] Int. Cl.$^2$ ................ C09K 3/34; G02F 1/13; C07C 121/64; C07C 69/96
[58] Field of Search ............... 252/299, 408 LC; 350/160 LC; 260/465 D, 463

[56] References Cited
UNITED STATES PATENTS

| | | | |
|---|---|---|---|
| 3,925,237 | 12/1975 | Ross et al. | 252/299 |
| 3,925,238 | 12/1975 | Gavrilovic | 252/299 |
| 3,947,375 | 3/1976 | Gray et al. | 252/299 |
| 3,951,846 | 4/1976 | Gavrilovic | 252/299 |
| 3,952,046 | 4/1976 | Scherrer et al. | 260/463 |
| 3,954,653 | 5/1976 | Yamazaki | 252/299 |

FOREIGN PATENTS OR APPLICATIONS 2,502,904  7/1975  Germany ................... 252/299

*Primary Examiner*—Benjamin R. Padgett
*Assistant Examiner*—T. S. Gron
*Attorney, Agent, or Firm*—G. H. Bruestle; B. E. Morris

[57] ABSTRACT

Liquid crystal compounds of the formula

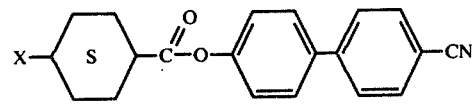

wherein X can be alkoxy (RO-), acyloxy

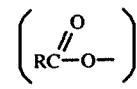

or alkylcarbonate

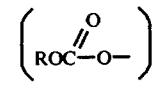

wherein R is an alkyl group from 1–10 carbon atoms, have positive dielectric anisotropy and are useful in electro-optic devices which comprise a thin liquid crystal layer between two closely spaced parallel electrodes.

9 Claims, 1 Drawing Figure

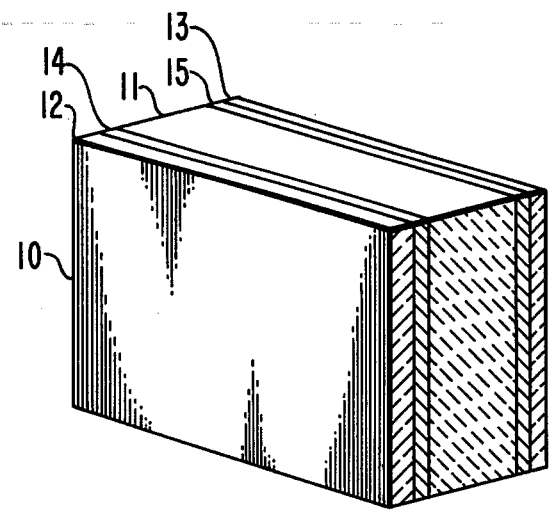

LIQUID CRYSTAL COMPOUNDS AND ELECTRO-OPTIC DEVICES INCORPORATING THEM

This invention relates to novel liquid crystal compounds and to electro-optic devices including them. More particularly, this invention relates to nematic liquid crystal compounds having positive dielectric anisotropy and to field effect liquid crystal cells.

BACKGROUND OF THE INVENTION

Liquid crystal or mesomorphic compositions are of increasing interest in a variety of electro-optic display devices. Liquid crystal compositions are of particular interest for electrically controllable, flat panel displays such as watch faces, digital clocks, calculator displays, numeric displays for instruments and the like. An electro-optic device; e.g. a liquid crystal cell, comprises a layer of a liquid crystal composition between two closely-spaced parallel conductive plates, at least one of which is transparent. When the conductive plates are connected to a source of voltage, an electric field is generated in the liquid crystal composition.

Field effect liquid crystal devices contain nematic compounds or mixtures of liquid crystal compounds having positive dielectric anisotropy. The conductive plates have been treated so that the liquid crystal molecules align themselves in a particular direction, usually parallel, to the plane of the plates. When an electric field is applied, the positive dielectric anisotropy of the molecules causes them to realign themselves in a direction parallel to the applied field and perpendicular to the plates. The change in alignment is made visible using a polarizer and an analyzer on either side of the cell. Field effect liquid crystal cells have the advantages of lower threshold voltages and wider viewing angle than other electro-optic devices such as dynamic scattering cells, and they have excellent contrast and long lifetimes.

U.S. Pat. of Gavrilovic, U.S. Pat. No. 3,951,846, incorporated herein by reference, discloses liquid crystal compounds having high and broad use temperature ranges which have the formula

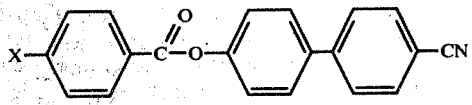

wherein X can be hydrogen, alkyl, alkoxy, acyloxy or alkylcarbonato wherein the alkyl groups have 1–10 carbon atoms. These liquid crystal compounds have positive dielectric anisotropy and are useful in field effect liquid crystal devices.

Each mesomorphic compound has a particular temperature range in which it is an ordered liquid, ranging from the solid to nematic liquid crystal melting point, up to the temperature at which it forms an isotropic liquid. This is the temperature range useful in electro-optic cells. Although, as is known, wide variations in use temperature ranges can be effected by employing mixtures of known liquid crystal compounds that are compatible with each other, no single liquid crystal compound or mixture of compounds now known can satisfy all of the use temperature ranges that are desired. The particular mesomorphic temperature range for each compound, or even whether a compound will be mesomorphic or not, is on the whole unpredictable. Thus, new liquid crystal compounds which have different use temperature ranges are being sought to satisfy various temperature requirements for which the liquid crystal cells will be employed.

SUMMARY OF THE INVENTION

It has been discovered that certain liquid crystal compounds which are the reaction product of 4-cyano-4'-hydroxybiphenyl and trans-4-alkoxy, acyloxy-, or alkylcarbonato-substituted cyclohexane carbonyl chloride compounds are liquid crystals which have high and broad mesomorphic temperature ranges and are useful in electro-optic devices.

BRIEF DESCRIPTION OF THE DRAWING

The FIGURE is a cross-sectional perspective view of an electro-optic device embodying the invention.

DETAILED DESCRIPTION OF THE INVENTION

The novel liquid crystal compounds have the formula

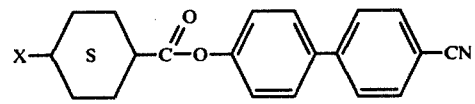

wherein X is alkoxy (RO—), acyloxy

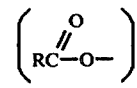

or alkylcarbonato

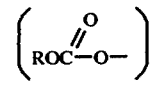

wherein R is an alkyl group of 1–10 carbon atoms. These compounds can be employed in electro-optic devices alone, in admixture with each other, or in admixture with other liquid crystal compounds to broaden the use temperature range or to vary the response time of the device.

The present compounds can be prepared by reacting 4-cyano-4'-hydroxybiphenyl and an appropriate trans-4-alkoxy-, acyloxy- or alkylcarbonato-substituted cyclohexane carbonyl chloride. The resultant liquid crystal compounds can be purified by conventional means, as by recrystallization, fractional distillation and the like.

Referring to the FIGURE, a liquid crystal cell 10 comprises a layer of a liquid crystal composition 11 between a front transparent support plate 12 and a back support plate 13. The front glass support plate 12 is coated on the inside surface thereof with a transparent conductive layer 14 which can be of tin oxide, to form an electrode. The back support plate 13 is also provided on the inside surface thereof with a conductive layer 15 to form the other electrode. If light is to be transmitted through the cell, the back electrode 15 and the back support plate 13 are also transparent and made of the same material as the front support plate 12 and front electrode 14. If the liquid crystal cell is to reflect light, the back electrode 15 can be made reflective, e.g., coated with aluminum. As is known, additional compounds such as wetting agents, aligning agents and the like can be added to the liquid crystal composition to improve the optical or electrical performance of the cell. In operation, the electrodes 14 and 15 are connected to a source of voltage (not shown). The electro-optic devices described above can be incorporated into various displays, such as electronic clocks, watches, advertising displays, numeric indicators and the like.

The invention will be further illustrated by the following examples, but it is to be understood that the invention is not meant to be limited to the details described therein. In the examples, parts and percentages are by weight unless otherwise noted.

The mesomorphic transition temperatures of the compounds prepared in the examples were determined using a Thomas-Hoover melting point apparatus, a differential scanning calorimeter and a polarizing hot stage microscope in conventional manner.

EXAMPLE 1

Preparation of 4-cyano-4'-biphenyl-(4-hexanoyloxy)cyclohexanecarboxylate

Part A

A mixture of 42 parts of p-hydroxybenzoic acid, 2 parts of platinum oxide, 1 part of 10% aqueous potassium hydroxide and 150 parts by volume of ethanol was charged to a hydrogenation flask. The mixture was hydrogenated at 50 psi for 32 hours. The reaction mixture was filtered and the solvent evaporated. The solid product was slurried in 500 parts by volume of hot cyclohexane to remove cyclohexane carboxylic acid, filtered, and the solids recrystallized from 100 parts of water. The solid, unreacted p-hydroxybenzoic acid, was filtered off and the water evaporated yielding 16 parts of 4-hydroxycyclohexane carboxylic acid having a melting point of 110°–130° C.

Part B

Ten parts of the product of Part A were refluxed in 100 parts of acetic anhydride under anhydrous conditions for 6 hours. Acetic anhydride and acetic acid were evaporated to leave an oily residue which was sublimed at 90° C./1 mm Hg. The resultant solid was recrystallized from ether to yield 2-oxabicyclo-(2.2.2)octane-3-one having a melting point of 125°–126° C.

Part C

Six parts of the product obtained in Part B, 50 parts of 20% aqueous potassium hydroxide and 50 parts by volume of methanol were refluxed for 1 hour, the mixture acidified with hydrochloric acid and saturated with sodium chloride. The mixture was extracted several times with methylene chloride and the extracts combined, dried over sodium sulfate and the solvent evaporated. The resultant solid was recrystallized from ethyl acetate. A yield of 4.2 parts of trans-4-hydroxycyclohexane carboxylic acid was obtained having a melting point of 149°–151° C.

Part D

A mixture of 1.4 parts of the product of Part C, 4.3 parts of hexanoic anhydride, 3 parts by volume of benzene and a catalytic amount of sulfuric acid was refluxed for 15 minutes, poured into 50 parts of water and extracted with benzene. The benzene extracts were combined and dried and the solvent evaporated. The oily residue was distilled at 180°–195° C./0.06 mm Hg to yield 1.5 parts of a yellowish liquid, trans-4-hexanoyloxycyclohexane carboxylic acid.

Part E

A mixture of 1.2 parts of the product of Part D and 10 parts by volume of thionyl chloride was refluxed under anhydrous conditions for 3 hours. The excess thionyl chloride was evaporated and the product distilled at 112°–115° C./0.07 mm Hg. A yield of 0.8 part of trans-4-hexanoyloxy cyclohexane carbonyl chloride was obtained as a yellowish liquid.

Part F

A mixture of 0.4 part of 4-cyano-4'-hydroxybiphenyl, 0.8 part of the product of Part E, 10 parts by volume of benzene and 2 parts by volume of pyridine was refluxed for one hour, washed with 9% aqueous hydrochloric acid, then with saturated sodium chloride, dried over anhydrous sodium sulfate and the solvent evaporated.

The product was recrystallized twice from isopropanol. A yield of 0.3 part of 4-cyano-4'-biphenyl(4-hexanoyloxy)-cyclohexanecarboxylate having the formula

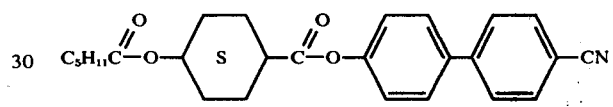

was obtained. This compound was mesomorphic, having a crystal to nematic transition temperature (CN) of 121° C. and a nematic to isotropic transition temperature (NL) of 208.5° C.

EXAMPLE 2

Preparation of 4-cyano-4'-biphenyl-(4-butylcarbonato)cyclohexanecarboxylate

Part A

A mixture of 1 part of trans-4-hydroxycyclohexane carboxylic acid, 2.2 parts of butylchloroformate, 10 parts by volume of benzene and 1.4 parts of pyridine was refluxed for four hours, poured into water and stirred for ½ hour. Fifty parts by volume of benzene was added, and the phases separated. The organic layer was washed first with 9% hydrochloric acid, then with saturated sodium chloride, dried and the solvent evaporated. The product was distilled at 170°–190° C./0.05 mm Hg. A yield of 0.3 part of 4-butylcarbonatocyclohexane carboxylic acid was obtained as a slightly yellow oil.

Part B

The product obtained in Part A was reacted with thionyl chloride following the procedure of Example 1, Part E to prepare trans-4-butylcarbonatocyclohexane carbonyl chloride as an oily residue.

Part C

The procedure of Example 1, Part F was followed except substituting the product of Part B above as the carbonyl chloride compound. The product was recrystallized from isopropanol.

4-cyano-4'-biphenyl(4-butylcarbonato) cyclohexane carboxylate having the formula

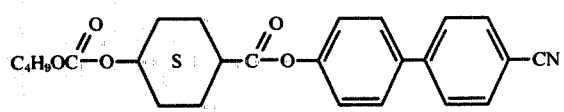

was obtained having a CN temperature of 117.5° C. and an NL temperature of 210.5° C.

EXAMPLE 3

Preparation of 4-cyano-4'-biphenyl(4-heptyloxy) cyclohexanecarboxylate

Part A

A mixture of 1.0 part of 4-hydroxycyclohexane carboxylic acid, 30 parts of potassium carbonate and 10 parts by volume of cyclohexanone was heated up to boiling when 4.0 parts of 1-bromoheptane were added. The reaction mixture was refluxed for 1 hour, filtered and the solvent removed under vacuum. A solution of 5 parts of potassium hydroxide, 25 parts of water and 25 parts by volume of methanol was added to the oily residue, the mixture refluxed for 2 hours, acidified with hydrochloric acid and extracted with methylene chloride. The organic extracts were combined, dried over sodium sulfate and the solvent evaporated. The resultant oily residue was distilled at 200°–210° C./0.07 mm Hg.

A yield of 0.2 part of 4-heptyloxycyclohexane carboxylic acid was obtained as a yellowish liquid.

Part B

The procedure of Example 1, Part E was followed except substituting the product of Part A above to form the corresponding carbonyl chloride.

Part C

The procedure of Example 1, Part F was followed except substituting the product of Part B above as the carbonyl chloride compound. The product was recrystallized from isopropanol.

4-cyano-4'-biphenyl(4-heptyloxy)cyclohexane carboxylate was obtained having the formula

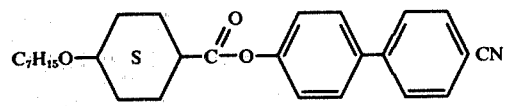

This compound has a CN temperature of 141.5° C. and an NL temperature of 196.0° C.

I claim:

1. In an electro-optic cell comprising a liquid crystal layer between two electrodes, the improvement wherein said liquid crystal includes a compound of the formula

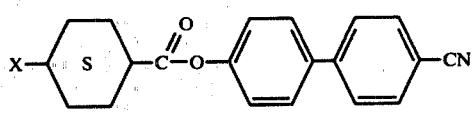

wherein X is a member selected from the group consisting of RO—,

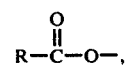

and

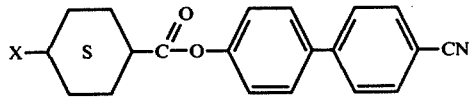

groups wherein R is an alkyl group of 1–10 carbon atoms.

2. A device according to claim 1 wherein both electrodes are transparent.

3. A liquid crystal compound having the formula

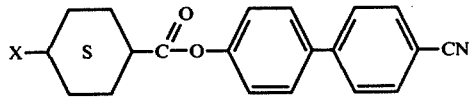

wherein X is a member selected from the group consisting of RO—,

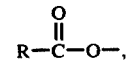

and

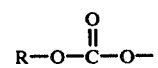

groups wherein R is an alkyl group of 1–10 carbon atoms.

4. A compound according to claim 3 wherein X is an RO— group.

5. A compound according to claim 3 wherein X is an

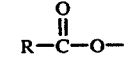

group.

6. A compound according to claim 3 wherein X is an

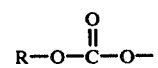

group.

7. A compound according to claim 4 wherein X is a heptyloxy group.

8. A compound according to claim 5 wherein X is hexanoyloxy.

9. A compound according to claim 6 wherein X is butylcarbonato.

* * * * *